United States Patent [19]

LeGrand et al.

[11] 4,427,584

[45] Jan. 24, 1984

[54] CONVERSION OF CELLULOSIC FIBERS TO MONO-SUGARS AND LIGNIN

[75] Inventors: Ferdinand LeGrand; Seymour S. Block, both of Gainesville, Fla.

[73] Assignee: University of Florida, Gainesville, Fla.

[21] Appl. No.: 374,949

[22] Filed: May 5, 1982

Related U.S. Application Data

[63] Continuation-in-part of Ser. No. 295,814, Aug. 24, 1981, abandoned.

[51] Int. Cl.³ .......................... C07G 1/00; C07H 1/00; C13K 1/02
[52] U.S. Cl. .................................. 260/124 R; 536/11; 536/56; 536/124; 536/127; 127/37
[58] Field of Search .................. 536/1.1, 124, 127, 56; 127/37; 260/124 R

[56] References Cited

U.S. PATENT DOCUMENTS 4,137,395 1/1979 Buchl et al. .......................... 536/127
4,357,467 11/1982 Sachetto et al. ...................... 536/56

FOREIGN PATENT DOCUMENTS 2016014 9/1979 United Kingdom .................. 127/37

Primary Examiner—Donald B. Moyer
Assistant Examiner—Elli Peselev
Attorney, Agent, or Firm—Arthur G. Yeager

[57] ABSTRACT

A process which comprises a stepwise treatment of natural fibers with liquid or gaseous sulphur trioxide to cause decrystallization of the alpha-cellulose therein, followed by hydrolysis of the treated fibers to produce (1) an aqueous solution of hexose sugars which can be utilized as feedstock when using a yeast organism to produce ethanol, (2) pentose sugars that may be used as a syrup for feed to ruminants, and (3) a residual lignin fraction that may be used as fuel to energize said process.

21 Claims, 3 Drawing Figures

CONVERSION OF CELLULOSIC FIBERS TO MONO-SUGARS AND LIGNIN

RELATED APPLICATIONS

This is a continuation-in-part of application Ser. No. 295,814 filed Aug. 24, 1981 now abandoned.

BACKGROUND OF THE INVENTION

The transformation of waste cellulosic materials into useful products has been studied for many years. Immense volumes of waste cellulosic products, such as wood, sawdust, hay, cornstalks, bagasse, pulp, paper, etc. are produced each year and, for the most part, are burned because there is no alternative economical use for the waste materials. It is known, however, that these cellulosic materials can be hydrolyzed into mono-sugars, such as glucose and xylose, which have utilities in the production of alcohol by fermentation and as a feed for ruminants, respectively. While processes to produce alcohol from waste cellulosic materials have been commercialized in the past, those processes have generally been abandoned in favor of more efficient processes which catalytically treat natural gas or petroleum products to produce methanol and ethanol. The economics of natural gas and petroleum have, of course, in more recent years suffered because of the rising costs for these basic materials, and accordingly, the processes for producing alcohol from cellulose are now much more favorable than anytime during past decades.

It has been known that cellulosic fibers, regardless of their source, always include alpha-cellulose, hemicellulose, and lignin, the proportions of these three components varying with the type of biomass. The two types of cellulose are capable of being hydrolyzed by acid treatment to mono-sugars, while lignin is not capable of being converted to such materials. In order for the acid treatment to function efficiently the natural form of crystalline alpha-cellulose must be decrystallized into an amorphous form. Subsequently, the amorphous alpha-cellulose can be hydrolyzed to glucose while hemicellulose can be hydrolyzed to xylose. The decrystallization of alpha-cellulose is known to be accomplished by dissolving it in a concentrated strong mineral acid. Hydrolysis of amorphous cellulose is known to be accomplished by treating the material under heat in the presence of an aqueous, mineral acid catalyst. While these processes have been known generally for many years, they have not been refined to produce efficiently and economically a solution fermentable by yeast and a syrup for feed to ruminants.

It is an object of this invention to provide an improved process for the decrystallization of alpha-cellulose. It is also an object of this invention to provide an improved process for hydrolyzing decrystallized alpha-cellulose and hemicellulose to recover an aqueous solution of glucose and xylose, respectively, and the residual lignin. Other objects will appear from the more detailed description of this invention which follows.

BRIEF SUMMARY OF THE INVENTION

This invention provides a process for converting crystalline alpha-cellulose to amorphous alpha-cellulose which comprises the sequential steps of:

a. subjecting fiber particles containing crystalline alpha-cellulose, and 20-30% moisture to liquid or gaseous $SO_3$ in hot air at a temperature of not greater than about 80° C., the amount $SO_3$ being 10-50% of the total amount of $SO_3$ needed to completely decrystallize said alpha-cellulose;

b. drying the treated fiber particles in this hot air mixture;

c. subjecting said dried particles to the remaining 50–90% of liquid or gaseous $SO_3$ in air of ambient temperature, resulting in a final concentration of formed $H_2SO_4$ of at least 75%;

d. subjecting the resulting mixture of fiber particles and concentrated $H_2SO_4$ to abrasion under pressure of at least 175 psi for a time of 4–8 minutes at 80°–150° C. to dissolve said crystalline alpha-cellulose; and e. recovering fiber components containing amorphous alpha-cellulose, hemicellulose, and lignin and being substantially free of crystalline alpha-cellulose.

This invention also provides a process for hydrolyzing amorphous alpha-cellulose to glucose comprising a plurality of treatment zones arranged for countercurrent flow of solid cellulosic fiber particles moistened with concentrated sulfuric acid in one direction, and a flow of hot aqueous extracting solution in the opposite direction, wherein the total contact time of said fiber particles with said hot aqueous solution is 5–10 minutes, each of said zones including steps of:

a. thoroughly mixing said fiber particles and said acid with said hot aqueous solution to form a hot acidic aqueous solution having a liquid-to-solid ratio of at least about 7 to 1 and at a temperature of 110°–127° C.;

b. separating solid fiber particles from said hot acidic aqueous solution;

c. feeding said separated fiber particles into the next succeeding zone in the direction of solids flow; and d. feeding said separated hot acidic aqueous solution into the next succeeding zone in the direction of liquid flow, and recovering from said process fiber particles consisting essentially of lignin and being substantially free of alpha-cellulose, hemicellulose, glucose, and xylose; and an acidic aqueous solution containing glucose and xylose.

It is also part of this invention to provide a process combining the above-described process for converting crystalline alpha-cellulose to amorphous alpha-cellulose with the above-described process for hydrolyzing cellulose and hemicellulose to glucose and xylose, respectively, by feeding the end product from the former process into the first treatment zone of the latter process.

BRIEF SUMMARY OF THE DRAWINGS

The novel features believed to be characteristic of this invention are set forth with particularity in the appended claims. The invention itself, however, both as to its organization and method of operation, together with further objects and advantages thereof, may best be understood by references to the following description taken in connection with the accompanying drawings in which:

DETAILED DESCRIPTION OF THE INVENTION

Figure 1:
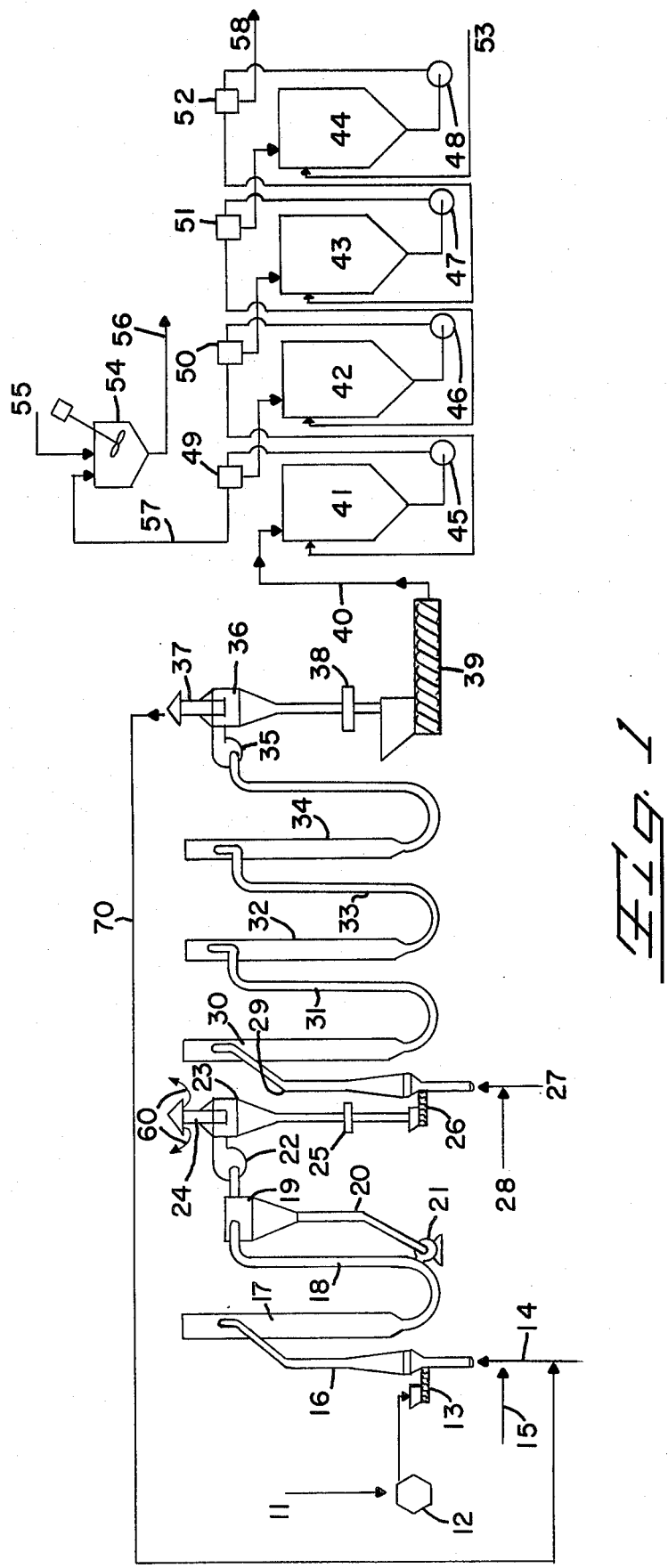
FIG. 1 is a schematic illustration of the process of this invention including decrystallization of alpha-cellulose and hydrolysis of amorphous alpha-cellulose and hemicellulose into the simple sugars of glucose and xylose, respectively, and into residual lignin.
Figure 2:
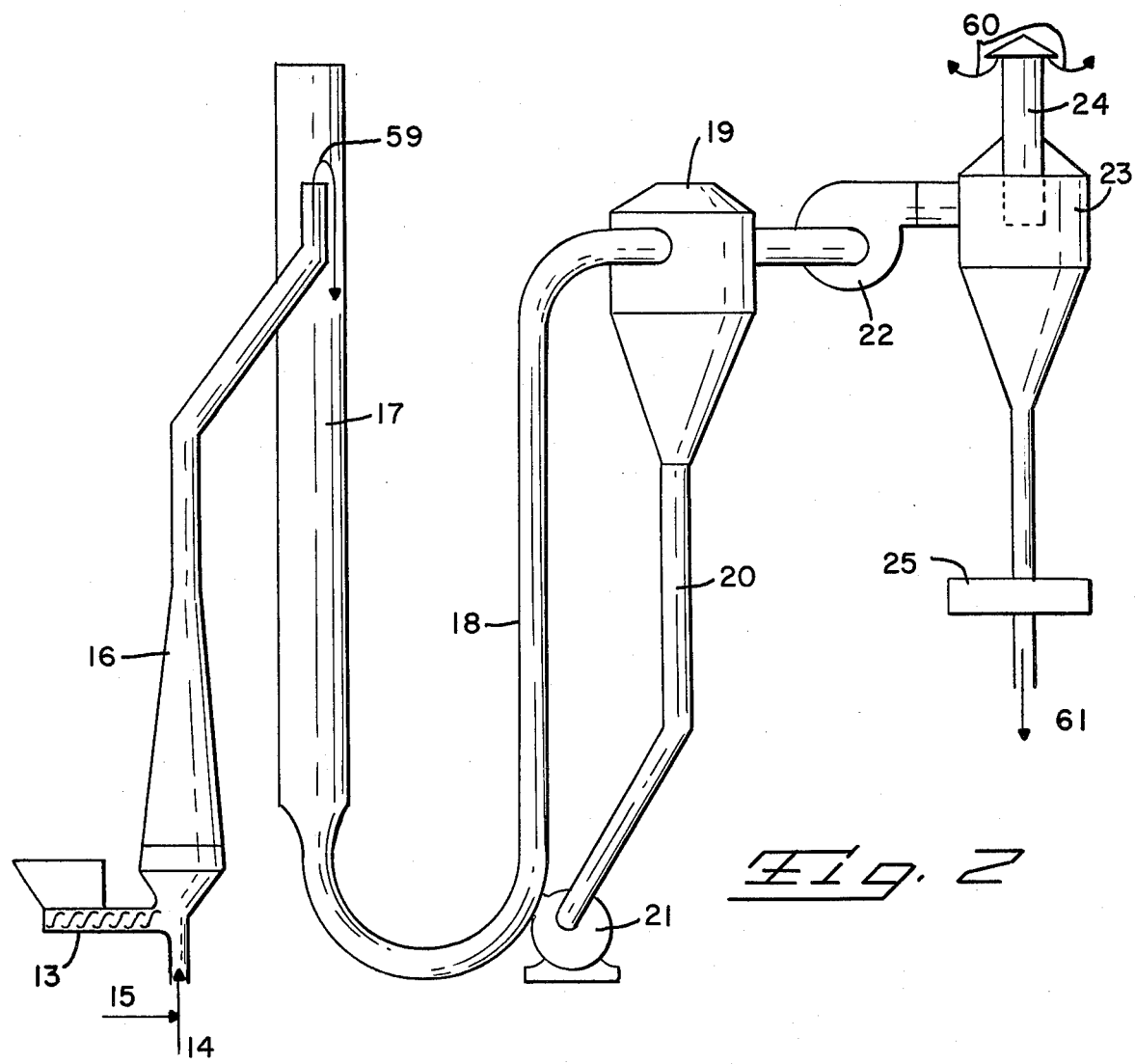
FIG. 2 is a detailed schematic illustration of a portion of the process for $SO_3$ addition and drying.
Figure 3:
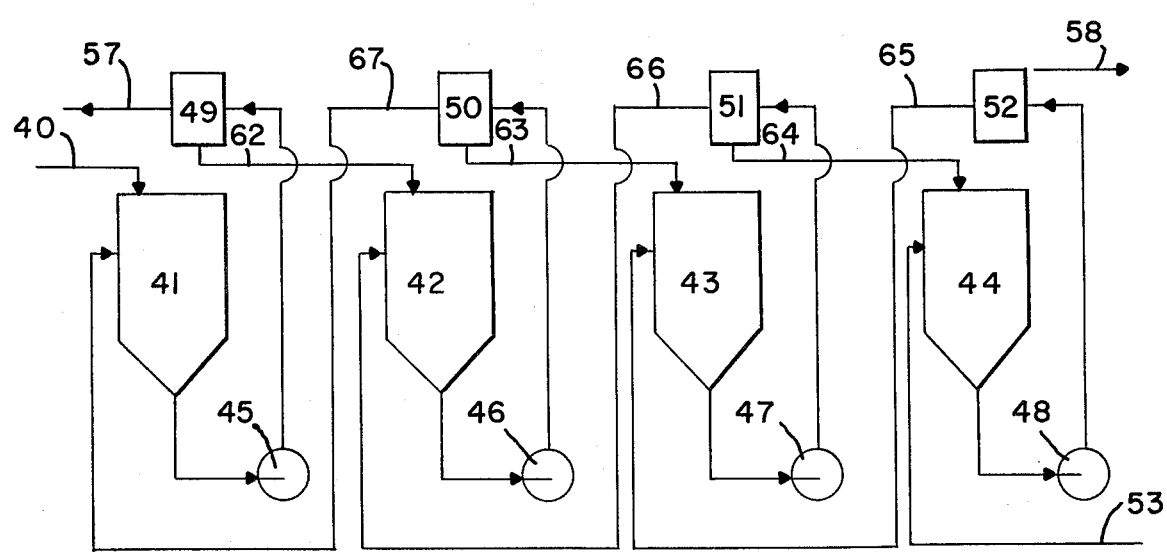
FIG. 3 is a detailed schematic illustration of the process for hydrolysis of amorphous cellulose and hemicellulose, and the recovery of glucose and xylose sugars and the recovery of lignin.

In FIG. 1 there is shown in small scale, the total integrated process of this invention starting with the cellulosic fiber raw material and producing as a product an aqueous solution of glucose and xylose, the former of which is admirably suitable as feed for a yeast fermentation to produce alcohol. FIG. 2 shows in large scale a component of the process for the addition of $SO_3$ and the drying of crystalline alpha-cellulose. FIG. 3 shows in large scale the hydrolysis process for converting amorphous alpha-cellulose and hemicellulose to glucose and xylose, respectively.

Cellulosic material 11, such as wood, cornstalks, bagasse, hay, etc., chopped into small sizes are fed into an attrition mill 12 to produce a powdery product having a particle size of not greater than about 10 mesh. This is necessary because all natural fibers are a mixture of alpha-cellulose, hemicellulose, and lignin intertwined with the cellulosic portions to such an extent that it is very difficult for a chemical catalyst to contact all of the alpha-cellulose unless the fibers are reduced to a small particle size to make it easier for the acid catalyst to reach the alpha-cellulose fraction. It is even easier in the process of this invention for this to occur when gaseous $SO_3$ is employed to form the acid catalyst, $H_2SO_4$, by reaction with inherent moisture of the fiber. Drying at a temperature of 80° C. maximum, and retention time also have an effect on the course of desired reaction since the cellulosic materials tend to carbonize at higher temperatures.

The first portion of the process of this invention involves contacting the crystalline alpha-cellulose and hemicellulose containing 30–40% moisture with liquid or gaseous $SO_3$ in a special two-stage process. The ground and powdery particles of cellulosic material are introduced into an auger or screw feeder 13 which pressurizes the particles and meters the cellulosic material into the bottom of the inlet leg of the first of two or more pneumatic dryers. Inlet leg 16 leads into the upper section of first drying tube 17 through which the material falls and passes into the inlet 18 of the first cyclone separator 19. At the same time there is introduced into the bottom of inlet leg 16 hot air 14 at a temperature of about 80° C. A part of the suplhur trioxide in the liquid or gaseous phase is injected at 15 as a metered quantity into the hot air inlet 14 and thence in the bottom of inlet leg 16 to be mixed with cellulosic particles. It is important that the amount of metered sulphur trioxide introduced at 15 be in the amount of about 10–50% of that which is totally needed to completely decrystallize all of the crystalline alpha-cellulose when accompanied with a subsequent step of abrading the alpha-cellulose. The particles entering through screw feeder 13 have been conditioned to have a moisture content of not more than about 30–40%, and this combined with the liquid or gaseous sulphur trioxide is sufficient to cause a calculated amount of sulphuric acid to be formed. It has been found that if a different quantity of the sulphur trioxide gas were introduced at this stage the process is much less efficient and will not produce the high yields of glucose which the present invention provides. Also, chances for carbonizing of cellulosic materials greatly increases. During subsequent drying, the mixture of cellulosic particles, air, and $SO_3$ passes downwardly through first drying tube 17 in the direction of arrow 59 as shown in FIG. 2. The mixture is then subjected to a first cyclone separator 19 which passes dried material through fan 22 to second cyclone separator 23; any material which is not sufficently dried and therefore is heavier than the portion passing to fan 22 recycles through return leg 20. The heavier material is returned to inlet 18 through blower 21 for further drying. In the top of second cyclone separator 23 there is located an air exhaust 24 through which hot air fed in to the system 14 is exhausted to the atmosphere. Exhaust is connected to separator 23 by a water seal which permits the exhaustion of air without losing the interior negative pressures of the system. The dried material falls downwardly from second separator 23, and passes through rotary vane valve 25 which is capable of discharging dried and partly treated cellulosic particles without destroyirg the pressure of the system. The remaining dried materials, are then passed into second auger or screw feeder 26 and then into a second treatment system somewhat similar to the one just described. The dried material entering second auger or screw feeder 26 should have a content of sulphuric acid equivalent to that produced by reacting the moisture with the $SO_3$ introduced at 15.

The particles entering the second treatment system are then conducted in similar fashion through inlet leg 29 to first reaction tube 30 and thence into inlet 31 of second reaction tube 32 and subsequently into inlet 33 of the third reaction tube 34. At the bottom of inlet 29 there is introduced air at 27 and the remaining 50-90% of the $SO_3$ at 28. The air introduced at 27 is at ambient temperature, i.e. 20°–30° C. The mass velocity of the mixture of air, $SO_3$, and fiber particles is reduced in the reaction tubes having a large cross section, permitting an intimate mixing of $SO_3$ with residual moisture in the fiber particles. The number of reaction tubes, 30,32, and 34 employed is variable, depending on the type of fiber to be treated and the amount of $SO_3$ per unit weight of dry fiber employed. It is preferred to employ a plurality of reaction tubes in this section of the operation, desirably three or four tubes. The reacted fiber passing through the reaction tubes and fan 35 is introduced into cyclone separator 36 which has an air exhaust 37 for return through line 70 and a heater (not shown) to air intake 14, to reutilize any nonreacted $SO_3$ The product from separator 36 passes through rotary vane valve 38 into a third auger or screw extrusion device 39.

It has been found that in accordance with this invention the stagewise introduction of $SO_3$ liquid or gas into the cellulosic particles having a limited moisture content provides the optimum pentration of $H_2SO_4$ into alpha-cellulose without carbonization during drying. It is believed that this occurs because the gas is able to reach the internal portions of the alpha-cellulose particles where it is transformed into sulphuric acid as compared to introducing liquid sulphuric acid which may not reach the innermost interstices of the cellulose particles. The application of $SO_3$ and the drying of fibers is accomplished in such manner that the final concentration of $H_2SO_4$ formed in situ is 75% or higher. This high concentration is needed to effectively dissolve alpha-cellulose in $H_2SO_4$ for decrystallization.

The decrystallization of alpha-cellulose into the amorphous form is best accomplished by completely penetrating the cellulosic material with concentrated acid and then subjecting that material to a pressurized shearing or abrasion, which causes the crystallized alpha-cellulose to dissolve in the concentrated $H_2SO_4$, and thereby to be transformed into amorphous alpha-cellulose. This is best accomplished in the present invention by an auger or screw extruder 39 fitted with a constant temperature mantle which provides a pressure on the fiber material of at least 175 psi during a contact or reaction time of 4–8 minutes at a temperature of about 110°–150° C. The product leaving the extruder in feed line 40 contains substantially no crystalline alpha-cellulose. The material in feed line 40, however, should contain sufficient sulphuric acid to catalyze the hydrolysis of the amorphous alpha-cellulose into glucose during this processing step. The product leaving auger or screw extruder 39 frequently is an agglomerate of smaller particles, and if this is the case, it should be reduced by a hammer mill or other equivalent device to a particle size of about 8–10 mesh.

The hydrolysis portion of this invention includes a countercurrent flow process in which the cellulose is hydrolyzed to sugars and the sugars are leached from the treated fiber. A plurality of treatment vessels is preferred for accomplishing this process, the exact number not being critical although the total contact time should not exceed about 5–10 minutes, when employing the preferred working temperature of 110°–127° C. As shown in FIGS. 1 and 3 there are preferably four such treatment vessels or zones 41,42,43, and 44. Each vessel is equipped with an outlet line that leads to a pump and in turn to a cyclone separator where solid and liquid phases are separated and fed, respectively, to the next succeeding treatment zone, the two phases proceeding in opposite directions so as to produce the countercurrent system. Cellulosic material that is to be converted to glucose and xylose is introduced in inlet line 40 to treatment zone 41. At the same time the extraction liquid comprising water that is heated with injected steam is introduced at the opposite end through line 53 to treatment zone 44. The solid material entering the system through line 40 continues to flow from vessel 41 to vessel 42 to vessel 43 to vessel 44 and is discharged through outlet 58. The extraction liquid from line 53 flows in the opposite direction from vessel 44 to vessel 43 to vessel 42 to vessel 41 and is discharged through line 57. Throughout all of the treatment zones 41–44 there is maintained sufficient water to produce a liquid-to-solid ratio of at least about 7 to 1. This ratio may be higher but if economical operation is a serious factor to consider, the ratio should not exceed about 15 to 1. The temperature throughout the hydrolysis section is maintained at a level of about 110°–127° C. when a retention time of 4–8 minutes is employed. These conditions of temperature and retention time are chosen to avoid the conversion of pentoses into furfural, a product which is toxic to the yeast organism that is used to convert the glucose produced in this invention into alcohol. These conditions, when combined with the formed sulphuric acid in the cellulosic fiber material entering through line 40, result in a concentration of acid of at least 0.5% which is adequate to accomplish the desired hydrolysis. Cellulosic material in line 40 and aqueous liquid in line 67 are introduced into zone 41. The mixture is agitated and continually drained into pump 45 which feeds the mixture into cyclone separator 49 which, in turn, separates aqueous solution of glucose and xylose in line 57 from cellulosic material in line 62. Similarly, it may be seen that in treatment zone 42 the cellulosic material from separator 49 enters through line 62 and is mixed with aqueous solution from line 66, drained from zone 42 into pump 46, which delivers the material into separator 50 to produce an aqueous solution for line 67 and cellulosic solids in line 63. The solid material in line 63 is fed into treatment zone 43 along with aqueous solution from line 65 to produce a mixture which is agitated and drained into pump 47 and delivered to cyclone separator 51 which produces an aqueous solution in line 66 and cellulosic solids in line 64. The solids in line 64 are fed into treatment zone 44 along with water and steam in line 53 to produce a mixture in reaction zone 44 which is drained into pump 48 and delivered to cyclone separator 52 to produce aqueous solution in line 65 and spent cellulosic material in line 58. The material in line 58 is principally lignin and whatever cellulosic material that remained unhydrolyzed throughout the processing step. The material in line 58 is of little value other than to be dried and burned as fuel.

The aqueous solution in line 57 may contain as much at 30% glucose and 30% xylose, although in practice the contents recovered from the stream cannot be expected to be much above about 25% when different types of fibers containing alpha-cellulose, hemicellulose and lignin are employed and operation variables are taken into account. The aqueous solution in line 57 is highly acidic due to the presence of the sulphuric acid as catalyst in the system, and in order to maintain the glucose and xylose in a stable phase it is mandatory to raise the pH to about 4.0 while, at the same time cooling immediately after hydrolysis. This is accomplished, as shown in FIG. 1, by feeding the solution in line 57 into vessel 54 and adding lime through line 55 with agitation. The resulting mixture leaving through line 56 has a pH of 4.0 and it is at a temperature below 80° F. and from which a precipitate of calcium sulfate can be removed by decanting and filtering to purify the solution. The glucose fraction of this material is an excellent feedstock for fermentation by yeast to produce ethanol. By the use of appropriate procedures, including vacuum distillation and molecular sieves, there can be readily produced alcohol of 99% or higher concentration.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A process for converting crystalline alpha-cellulose to amorphous alpha-cellulose which comprises the sequential steps of:
   a. subjecting fiber particles containing crystalline alpha-cellulose and 20–30% moisture to a mixture of air and liquid or gaseous $SO_3$ at a temperature of not greater than about 80° C., the amount of $SO_3$ being 10–50% of the total amount of $SO_3$ needed to completely decrystallize said alpha-cellulose;
   b. simultaneously drying the treated fiber particles in said mixture of air and $SO_3$;
   c. subjecting said dried fiber particles to the remaining 50–90% of liquid or gaseous $SO_3$ in air at ambient temperature to produce a final concentration of at least 75% of $H_2SO_4$ formed in situ on said fiber particles;
   d. subjecting the resulting mixture of concentrated $H_2SO_4$ and fiber particles to abrasion under pressure of at least 175 psi for a reaction time of 4–8 minutes at a temperature of 80°–150° C. to dissolve crystalline alpha-cellulose; and e. recovering fibers containing acidified amorphous alpha-cellulose, hemicellulose, and lignin, and being substantially free of crystalline alpha-cellulose.

2. The process of claim 1 wherein said particles of fibers containing crystalline alpha-cellulose are of a size of not greater than about 10 mesh before contact with the mixture of air and liquid or gaseous $SO_3$.

3. The process of claim 1 wherein said abrasion under pressure of at least 175 psi is achieved by passing said fiber particles through a rotary screw press which pressurizes said particles at a temperature of about 110°–150° C. to obtain amorphous alpha-cellulose.

4. The process of claim 1 wherein the weight of said $SO_3$ does not exceed about 10% by weight of said fiber particles.

5. The process of claim 1 wherein said fibers recovered from said abrasion treatment are subjected to a size reduction to produce fiber particles having a size of about 8–10 mesh.

6. A process for hydrolyzing amorphous cellulose to glucose and xylose comprising a plurality of treatment zones arranged for countercurrent flow of solid cellulose fiber particles, moistened with concentrated sulfuric acid, in one direction and flow of hot aqueous extracting solution in the opposite direction wherein the total contact time of said fiber particles with said hot aqueous solution is 5–10 minutes, each of said zones including the steps of:

a. thoroughly mixing said fiber particles and said acid with said hot aqueous solution at a liquid-to-solid ratio of at least 7 to 1 and at a temperature of 110°–127° C., for a time of 5–10 minutes;

b. separating solid fiber particles from said hot aqueous solution;

c. feeding said separated fiber particles into the next succeeding zone in the direction of solids flow; and d. feeding said separated hot aqueous solution into the next succeeding zone in the direction of liquid flow, and from said process recovering fiber particles consisting essentially of lignin and being substantially free of amorphous alpha-cellulose, hemicellulose, glucose, and xylose; and an aqueous solution containing glucose and xylose.

7. The process of claim 6 wherein said fiber particles containing amorphous cellulose, hemicellulose, and lignin are fed into said process containing concentrated sulfuric acid of more than 75% concentration.

8. The process of claim 6 wherein said cellulosic fiber particles include particles containing alpha-cellulose and particles containing hemicellulose.

9. The process of claim 6 wherein said fiber particles comprise about equal parts by weight of alpha-cellulose, hemicellulose, and lignin.

10. The process of claim 6 wherein the temperature in each said treatment zone is maintained at about 120°–125° C. and the total contact time for $SO_3$ treated and abraded fiber and liquid in all of said treatment zones is about 5–10 minutes, whereby any substantial furfural formation is avoided.

11. The process of claim 6 wherein said recovered aqueous solution contains xylose and glucose.

12. The process of claim 6 wherein each of said treatment zones contains an aqueous reaction medium of water, mono-sugars, and sulfuric acid at a concentration of at least 0.5%.

13. The process of claim 6 wherein said recovered aqueous solution is treated to adjust its pH to about 4.0 and cooled to not more than 80° F.

14. The process of claim 13 wherein said adjustment of pH to about 4.0 is accomplished by adding lime to said recovered aqueous solution.

15. The process of claim 6 wherein said liquid-to-solids ratio is about 7–15:1.

16. A process for converting cellulose to glucose and xylose comprising:

a. reducing the particle size of fibers containing alpha-cellulose to about 10 mesh;

b. subjecting said fiber particles at a moisture content of 20–30% to a mixture of air and liquid or gaseous $SO_3$ at a temperature of not greater than 80° C., the amount of $SO_3$ being 10–50% of that needed to completely decrystallize the alpha-cellulose in said particles;

c. drying the treated particles in the mixture of air and $SO_3$;

d. subjecting the dried particles to the remaining 50–90% of liquid or gaseous $SO_3$ in air at a temperature of 20°–30° C.;

e. abrading the resulting treated particles under a pressure of at least 175 psi for a time of 4–8 minutes at a temperature of 80°–150° C. to dissolve crystalline alpha-cellulose in the concentrated $H_2SO_4$ formed in situ from said $SO_3$ and said moisture, and thereby to convert said crystalline alpha-cellulose to amorphous alpha-cellulose.

f. feeding the abraded particles containing amorphous alpha-cellulose into the first of a plurality of treatment zones as a solids stream and feeding hot water and steam into the last of said treatment zones, as a liquid stream, and passing said solids stream and said liquid stream in countercurrent flow with respect to each other through said treatment zones at a temperature of 110°–127° C. and at a liquid-to-solids ratio of at least 7 to 1;

g. separating said particles from said aqueous solution emanating from each said treatment zone and passing the separated portions, respectively, in opposite directions to the next treatment zone; and h. recovering from said first treatment zone an aqueous solution containing glucose and xylose, and recovering from said last treatment zone particles containing lignin and being substantially free of cellulose and mono-sugars.

17. The process of claim 16 wherein said recovered aqueous solution of glucose and xylose is treated to adjust its pH to about 4.0 and cooled to not more than 80° F.

18. The process of claim 16 wherein said abraded particles contain amorphous alpha-cellulose, hemicellulose, and lignin.

19. The process of claim 16 wherein each of said treatment zones is maintained at a temperature of about 121° C. and the total contact time through all of said treatment zones is about 5–10 minutes.

20. The process of claim 16 wherein said aqueous final solution contains 20–30% glucose.

21. The process of claim 16 wherein said aqueous final solution contains 20–30% xylose.

* * * * *

UNITED STATES PATENT AND TRADEMARK OFFICE
CERTIFICATE OF CORRECTION

PATENT NO. : 4,427,584
DATED : January 24, 1984
INVENTOR(S) : Ferdinand LeGrand, Seymour S. Block It is certified that error appears in the above-identified patent and that said Letters Patent are hereby corrected as shown below:

Change the name of the inventor "Ferdinand LeGrand" to read
-- Ferdinand le Grand --

Column 1, between lines 9 and 10, after "BACKGROUND OF THE
INVENTION" insert the following paragraph
-- The Government has rights in this invention
pursuant to Contract Number DE-FG-44 80R410169
awarded by the U.S. Department of Energy. --

Column 4, line 11, after "Exhaust" insert -- 24 -- line 18, change "destroyirg" to read -- destroying -- line 46, after "$SO_3$" insert a period -- . -- line 53, change "pentration" to read -- penetration --

Signed and Sealed this

Twelfth Day of March 1985

[SEAL]

Attest:

DONALD J. QUIGG

Attesting Officer     Acting Commissioner of Patents and Trademarks